(12) United States Patent
Wang et al.

(10) Patent No.: US 12,260,556 B2
(45) Date of Patent: Mar. 25, 2025

(54) IMAGE SEGMENTATION METHOD, SYSTEM, AND DEVICE, AND READABLE STORAGE MEDIUM

(71) Applicant: INSPUR SUZHOU INTELLIGENT TECHNOLOGY CO., LTD., Jiangsu (CN)

(72) Inventors: Li Wang, Jiangsu (CN); Zhenhua Guo, Jiangsu (CN); Nan Wu, Jiangsu (CN); Yaqian Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 432 days.

(21) Appl. No.: 17/801,332

(22) PCT Filed: Oct. 27, 2020

(86) PCT No.: PCT/CN2020/124074
§ 371 (c)(1),
(2) Date: Aug. 22, 2022

(87) PCT Pub. No.: WO2021/164299
PCT Pub. Date: Aug. 26, 2021

(65) Prior Publication Data
US 2023/0083518 A1   Mar. 16, 2023

(30) Foreign Application Priority Data

Feb. 20, 2020 (CN) .......................... 202010104946.8

(51) Int. Cl.
*G06T 7/11* (2017.01)
(52) U.S. Cl.
CPC ...... *G06T 7/11* (2017.01); *G06T 2207/20084* (2013.01)

(58) Field of Classification Search
CPC .... G06V 10/82; G06V 10/764; G06V 10/454; G06V 10/26; G06N 3/04; G06N 3/0464;
(Continued)

(56) References Cited

U.S. PATENT DOCUMENTS

| 9,773,196 B2 | 9/2017 | Sachs et al. |
| 2019/0251694 A1 | 8/2019 | Han et al. |

FOREIGN PATENT DOCUMENTS

| CN | 108460411 A | 8/2018 |
| CN | 108510473 A | 9/2018 |

(Continued)

OTHER PUBLICATIONS

Wang, Chien-Yao, CSPNet: a New Backbone That Can Enhance Learning Capability of CNN, arXiv:1911.11929v1 [cs.CV] Nov. 27, 2019 (Year: 2019).*

(Continued)

*Primary Examiner* — Raphael Schwartz
(74) *Attorney, Agent, or Firm* — Cooper Legal Group, LLC

(57) ABSTRACT

Disclosed is an image segmentation method, including: obtaining an original image set; performing feature extraction on the original image set by using a backbone network to obtain a feature map set; performing channel extraction fusion processing on the feature map set by using a channel extraction fusion model to obtain an enhanced feature map set; and segmenting the enhanced feature map set by using a preset convolutional neural network to obtain an image segmentation result. In addition, the present application also provides an image segmentation system and device, and a readable storage medium, which have the beneficial effects above.

11 Claims, 9 Drawing Sheets

(58) Field of Classification Search
CPC .................. G06N 3/0455; G06N 3/045; G06T 2207/20084; G06T 7/11
See application file for complete search history.

(56) References Cited

FOREIGN PATENT DOCUMENTS

| CN | 109447990 A | 3/2019 |
|---|---|---|
| CN | 109829506 A | 5/2019 |
| CN | 110197468 A | 9/2019 |
| CN | 110490082 A | 11/2019 |
| CN | 110807463 A | 2/2020 |
| CN | 111369568 A | 7/2020 |

OTHER PUBLICATIONS

Li, Hao. "Pruning Filters for Efficient ConvNets." ICLR 2017, arXiv:1608.08710v3 (Year: 2017).*
Ronneberger, Olaf, Philipp Fischer, and Thomas Brox. "U-net: Convolutional networks for biomedical image segmentation." Medical image computing and computer-assisted intervention—MICCAI 2015: 18th international conference, Munich, Germany, Oct. 5-9, 2015, proceedings, part III (Year: 2015).*
Yang, Zhengeng, et al. "Real time backbone for semantic segmentation." arXiv preprint arXiv:1903.06922 (2019). (Year: 2019).*
International Search Report cited in PCT application PCT/CN2020/124074, mailed Jan. 22, 2021, 5 pages.
Written Opinion of International Searching Authority of corresponding PCT application PCT/CN2020/124074, mailed Jan. 22, 2021, 9 pages.

* cited by examiner

IMAGE SEGMENTATION METHOD, SYSTEM, AND DEVICE, AND READABLE STORAGE MEDIUM This application claims priority to Chinese Patent Application No. 202010104946.8, filed on Feb. 20, 2020, in China National Intellectual Property Administration and entitled "Image Segmentation Method, System, and Device, and Readable Storage Medium", the contents of which are hereby incorporated by reference in its entirety.

FIELD

The present application relates to the field of image segmentation, and particularly to an image segmentation method, system, and device, and a readable storage medium.

BACKGROUND

Image segmentation technology is an important research direction in the field of computer vision and an important part of image semantics understanding. Image segmentation refers to a process of segmenting an image into a plurality of regions with similar properties. In recent years, the image segmentation technology has been developed rapidly, and scene object segmentation, human foreground and background segmentation, human face and body analysis, three-dimensional reconstruction, and other technologies related to this technology have been applied extensively to industries of self-driving, augmented reality, security monitoring, etc.

It is well known that deep learning has achieved great success in solving problems of image classification, image segmentation, object detection, etc., in the field of computer vision. There have emerged many good convolutional neural network models recently. However, most of these models are large in calculation amount and size and applicable to servers only, and need to be accelerated by high-performance Graphics Processing Units (GPUs) for operation.

Therefore, how to reduce the calculation amount in an image segmentation process and improve the segmentation precision is a technical problem that needs to be solved by those skilled in the art currently.

SUMMARY

An objective of the present application is to provide an image segmentation method, system, and device, and a readable storage medium, to reduce the calculation amount in an image segmentation process and improve the segmentation precision.

In order to solve the foregoing technical problem, the present application provides an image segmentation processing method, including:
  obtaining an original image set;
  performing feature extraction on the original image set by using a backbone network to obtain a feature map set;
  performing channel extraction fusion processing on the feature map set by using a channel extraction fusion model to obtain an enhanced feature map set; and
  segmenting the enhanced feature map set by using a preset convolutional neural network to obtain an image segmentation result.

In some embodiments, when the channel extraction fusion model includes a first channel extraction fusion sub-model, the performing channel extraction fusion processing on the feature map set by using a channel extraction fusion model to obtain an enhanced feature map set includes:
  starting a first channel selection process of the first channel extraction fusion sub-model to perform channel selection on the feature map set to obtain a first enhanced feature map subset;
  starting a first feature extraction process of the first channel extraction fusion sub-model to perform feature extraction on the feature map set to obtain a second enhanced feature map subset; and
  superimposing the first enhanced feature map subset and the second enhanced feature map subset according to channels to obtain the enhanced feature map set.

In some embodiments, the starting a first channel selection process of the first channel extraction fusion sub-model to perform channel selection on the feature map set to obtain a first enhanced feature map subset includes:
  calculating a feature vector of each feature map in the feature map set;
  calculating a weight value of each feature map by using an activation function according to each feature vector;
  sorting each weight value from large to small, and selecting a preset proportion of top-ranking weight values as enhanced weight values; and
  selecting the channel corresponding to each feature map according to a channel position corresponding to each enhanced weight value, and performing multiplication to obtain the first enhanced feature map subset.

In some embodiments, the starting a first feature extraction process of the first channel extraction fusion sub-model to perform feature extraction on the feature map set to obtain a second enhanced feature map subset includes:
  reading a weight value of each feature map, and determining an extraction probability of each channel according to each weight value;
  extracting a preset proportion of channels as enhanced channels according to the extraction probability of each channel, and determining the feature maps corresponding to the enhanced channels as enhanced feature maps;
  performing feature extraction on each enhanced feature map to obtain a feature vector;
  calculating a weight value of each enhanced feature map by using an activation function according to each feature vector; and
  selecting the channel corresponding to each enhanced feature map according to a channel position corresponding to each weight value, and performing multiplication to obtain the second enhanced feature map subset.

In some embodiments, when the channel extraction fusion model includes a second channel extraction fusion sub-model, the performing channel extraction fusion processing on the feature map set by using a channel extraction fusion model to obtain an enhanced feature map set includes:
  starting a second channel selection process of the second channel extraction fusion sub-model to perform channel selection on the feature map set to obtain a third enhanced feature map subset;
  starting a second feature extraction process of the second channel extraction fusion sub-model to perform feature extraction on the feature map set to obtain a fourth enhanced feature map subset; and
  superimposing the third enhanced feature map subset and the fourth enhanced feature map subset according to channels to obtain the enhanced feature map set.

In some embodiments, the starting a second channel selection process of the second channel extraction fusion sub-model to perform channel selection on the feature map set to obtain a third enhanced feature map subset includes:
performing a depthwise separable convolution operation on each feature map in the feature map set to obtain a down-sampled feature map;
calculating a feature vector of each down-sampled feature map, and calculating a weight value of each down-sampled feature map by using an activation function according to each feature vector; and
selecting the channel corresponding to each down-sampled feature map according to a channel position corresponding to each weight value, and performing multiplication to obtain the third enhanced feature map subset.

In some embodiments, the starting a second feature extraction process of the second channel extraction fusion sub-model to perform feature extraction on the feature map set to obtain a fourth enhanced feature map subset includes:
halving a length and width of each feature map in the feature map set to obtain a down-sampled feature map;
calculating a feature vector of each down-sampled feature map, and calculating a weight value of each down-sampled feature map by using an activation function according to each feature vector; and
selecting the channel corresponding to each down-sampled feature map according to a channel position corresponding to each weight value, and performing multiplication to obtain the fourth enhanced feature map subset.

The present application also provides an image segmentation system, including:
an obtaining module, configured to obtain an original image set;
a feature extraction module, configured to perform feature extraction on the original image set by using a backbone network to obtain a feature map set;
a channel extraction fusion module, configured to perform channel extraction fusion processing on the feature map set by using a channel extraction fusion model to obtain an enhanced feature map set; and
an image segmentation module, configured to segment the enhanced feature map set by using a preset convolutional neural network to obtain an image segmentation result.

The present application also provides an image segmentation device, including:
a memory, configured to store a computer program; and
a processor, configured to execute the computer program to implement any steps of the image segmentation method as described above.

The present application also provides a readable storage medium, storing a computer program that is executed by a processor to implement any steps of the image segmentation method as described above.

The present application provides an image segmentation method, including: obtaining an original image set; performing feature extraction on the original image set by using a backbone network to obtain a feature map set; performing channel extraction fusion processing on the feature map set by using a channel extraction fusion model to obtain an enhanced feature map set; and segmenting the enhanced feature map set by using a preset convolutional neural network to obtain an image segmentation result.

According to the technical solution provided in the present application, channel extraction fusion processing is performed on the feature map set by using the channel extraction fusion model to obtain the enhanced feature map set, and then the enhanced feature map set is segmented by using the preset convolutional neural network to obtain the image segmentation result. Therefore, the obtained enhanced feature map set has more obvious features, the number of input channels is reduced, and the segmentation precision is improved while the calculation amount in the image segmentation process is reduced. In addition, the present application also provides an image segmentation system and device, and a readable storage medium, which have the beneficial effects above. Elaborations are omitted herein.

BRIEF DESCRIPTION OF THE DRAWINGS

In order to describe the technical solutions in embodiments of the present application or the prior art more clearly, the drawings required to be used in descriptions about the embodiments or the prior art will be introduced briefly below. Apparently, the drawings in the description below are only the embodiments of the present application. Those ordinarily skilled in the art may further obtain other drawings according to the provided drawings without creative work.

DETAILED DESCRIPTION

A core of the present application is to provide an image segmentation method, system, and device, and a readable storage medium, to reduce the calculation amount in an image segmentation process and improve the segmentation precision.

In order to make the objective, technical solutions, and advantages of the embodiments of the present application clearer, the technical solutions in the embodiments of the present application will be described clearly and completely below in combination with the drawings in the embodiments of the present application. Clearly, the described embodiments are not all but part of embodiments of the present application. All other embodiments obtained by those ordinarily skilled in the art based on the embodiments in the present application without creative work shall fall within the scope of protection of the present application.

Figure 1:
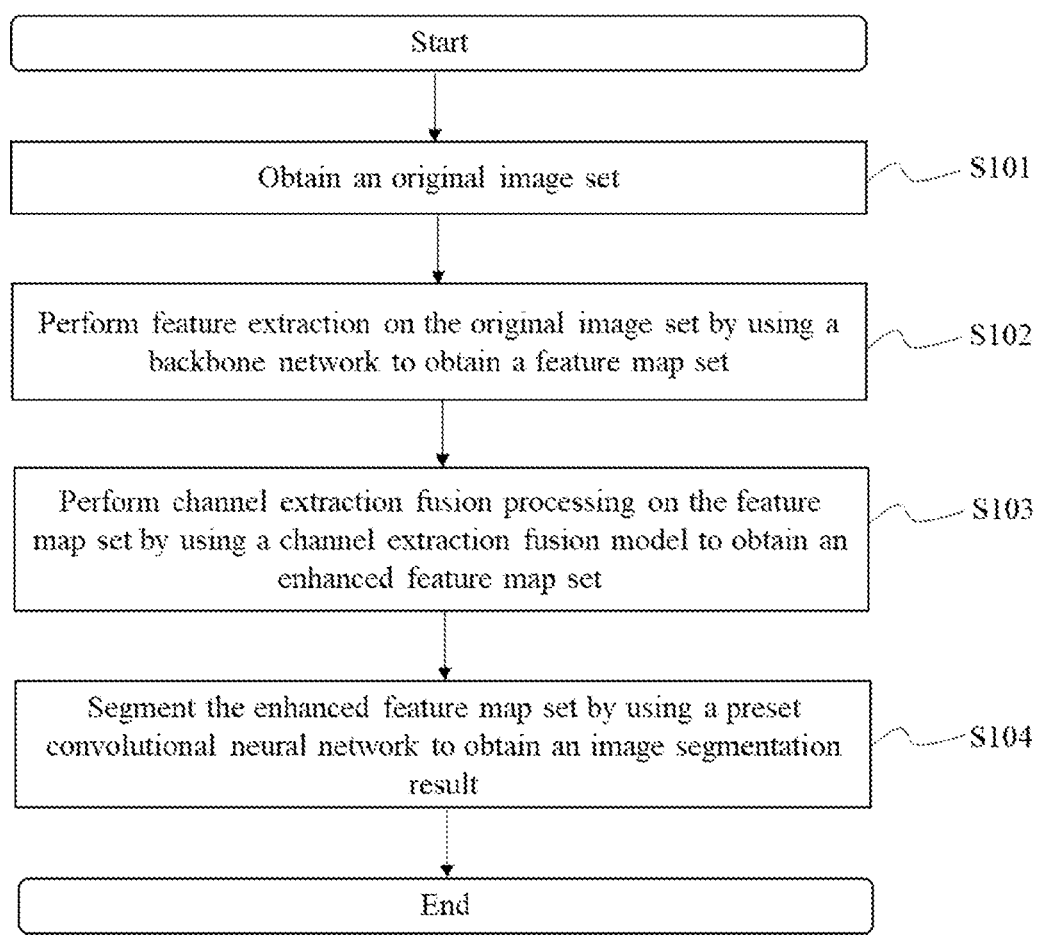
FIG. 1 is a flowchart of an image segmentation method according to an embodiment of the present application.

Referring to FIG. 1, FIG. 1 is a flowchart of an image segmentation method according to an embodiment of the present application.

The method specifically includes the following steps.

At S101, an original image set is obtained.

Currently, all convolutional neural network models are large in calculation amount and size, generally hundreds of bytes, and are hard to deploy in embedded systems with limited hardware resources. In addition, all Application (APP) software is downloaded and updated through APP stores. For such APP software, their sizes are very important. This is because if the APP software is too large and slow to download, user experiences are affected, and many users may not download or update these software.

There is much existing image related software using convolutional neural network models. However, all existing mainstream convolutional neural network models are large, leading to great difficulties in large-scale application of convolutional neural network models to mobile devices such as smart phones.

In addition, for a large convolutional neural network, the operation of the large convolutional neural network needs a large memory bandwidth for reading and calculation, and also needs multiple floating-point operations. Therefore, much electric power is consumed.

A large network cannot be completely deployed in a dynamic random access memory, and thus the dynamic random access memory needs to be accessed for many times, which consumes more electric power. A mobile device such as a smart phone is limited in battery capacity, which brings some difficulties to the deployment of a convolutional neural network model in the mobile device. Therefore, the present application provides an image segmentation method, to solve the foregoing problems.

The original image set mentioned herein may specifically be an image set input by a user, or an image set downloaded by a server connected to a specified website. No specific limits are made thereto in the present application.

At S102, feature extraction is performed on the original image set by using a backbone network to obtain a feature map set.

In some embodiments, the backbone network mentioned herein may include, but not limited to, a classification Residual Network (Resnet), a convolutional neural network, etc.

At S103, channel extraction fusion processing is performed on the feature map set by using a channel extraction fusion model to obtain an enhanced feature map set.

After the feature map set is obtained, in the present application, channel extraction fusion processing is performed on the feature map set by using a channel extraction fusion model to obtain an enhanced feature map set. Therefore, the obtained enhanced feature map set has more obvious features, the number of input channels is reduced, and the effect of improving the segmentation precision while reducing the calculation amount in the image segmentation process is achieved.

In some embodiments, the channel extraction fusion model mentioned herein may include a first channel extraction fusion sub-model and/or a second channel extraction fusion sub-model. The first channel extraction fusion sub-model may screen feature maps, thereby providing feature map channels most conducive to segmentation for subsequent calculation. The second channel extraction fusion sub-model may down-sample the feature maps such that the obtained enhanced feature map set may fuse features of higher layers.

At S104, the enhanced feature map set is segmented by using a preset convolutional neural network to obtain an image segmentation result.

After the enhanced feature map set with more obvious features is obtained, the enhanced feature map set is segmented by using a preset convolutional neural network so as to obtain a more accurate image segmentation result.

Figure 2:
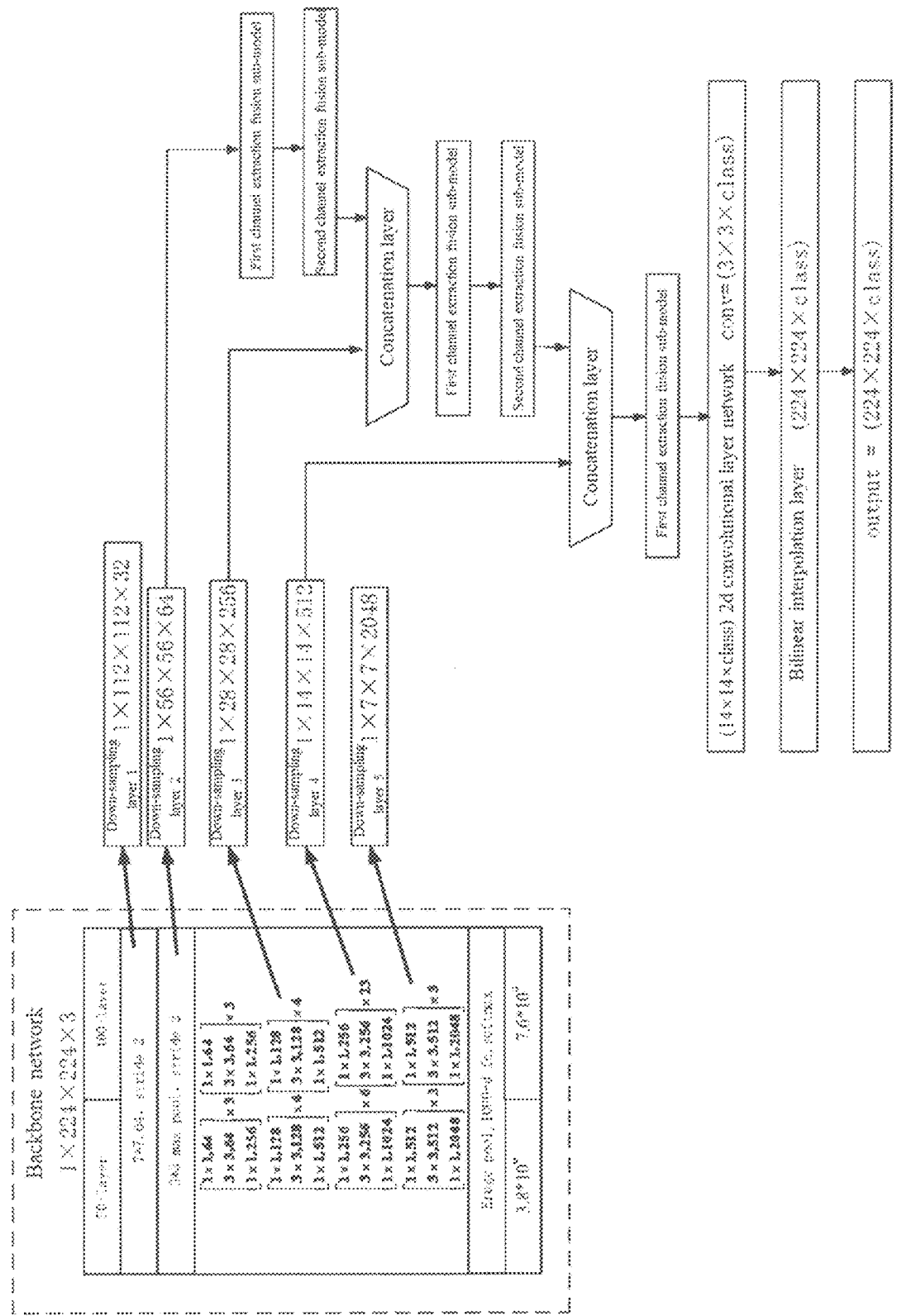
FIG. 2 is an overall structural diagram of an image segmentation process according to an embodiment of the present application.

The following makes descriptions in combination with FIG. 2 taking the condition that the channel extraction fusion model includes a first channel extraction fusion sub-model and a second channel extraction fusion sub-model as an example. As shown in FIG. 2, the backbone network preforms down-sampling for totally five times. Output features of down-sampling layer 2/3/4 are used in the embodiment of the present application.

For data of down-sampling layer 2, in the present application, a first enhanced feature map set is obtained first by using the first channel extraction fusion sub-model, and then the first enhanced feature map set is further processed by using the second channel extraction fusion sub-model to obtain a second enhanced feature map set.

For data of down-sampling layer 3, in the present application, the data of down-sampling layer 3 is concatenated with the second enhanced feature map set by using a concatenation layer, and then concatenated data is processed sequentially by using the first channel extraction fusion sub-model and the second channel extraction fusion sub-model.

For data of down-sampling layer 4, in the present application, the data of down-sampling layer 4 is concatenated with processed data of the down-sampling layer 3 by using the concatenation layer, then data obtained by concatenation is processed sequentially by using the first channel extraction fusion sub-model, a convolutional layer network, and a bilinear interpolation layer, and a final processing result is output.

Based on the above technical solution, according to the image segmentation method provided in the present application, channel extraction fusion processing is performed on the feature map set by using the channel extraction fusion model to obtain the enhanced feature map set, and then the enhanced feature map set is segmented by using the preset convolutional neural network to obtain the image segmentation result. Therefore, the obtained enhanced feature map set has more obvious features, the number of input channels is reduced, and the segmentation precision is improved while the calculation amount in the image segmentation process is reduced.

Figure 3:
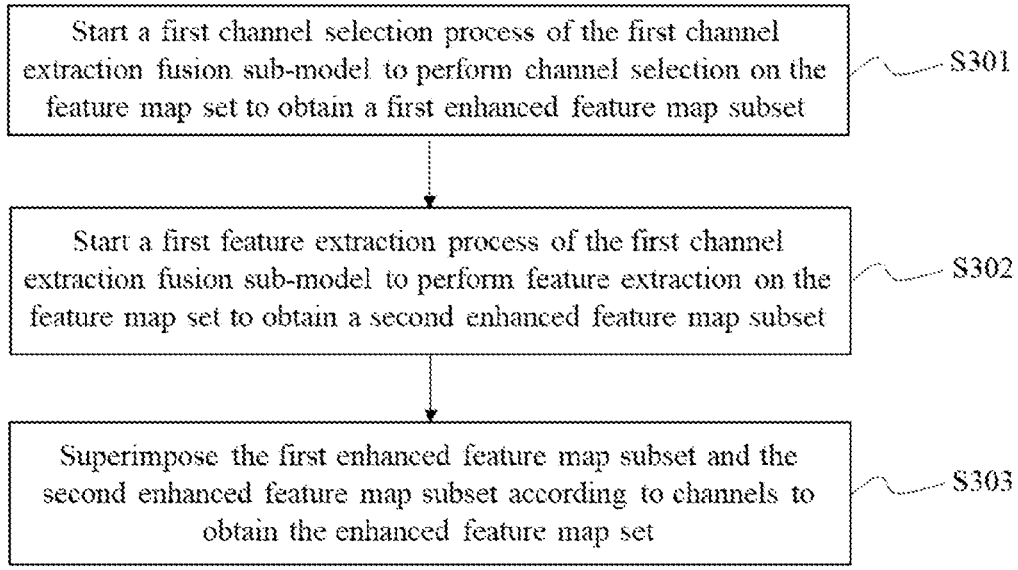
FIG. 3 is a flowchart of a practical representation mode of S103 in the image segmentation method in FIG. 1.

For step S103 in the previous embodiment, when the channel extraction fusion model includes a first channel extraction fusion sub-model, the described step that channel extraction fusion processing is performed on the feature map set by using a channel extraction fusion model to obtain an enhanced feature map set may specifically be implemented by steps shown in FIG. 3. The following makes descriptions in combination with FIG. 3.

Referring to FIG. 3, FIG. 3 is a flowchart of a practical representation mode of S103 in the image segmentation method in FIG. 1.

The following steps are specifically included.

At S301, a first channel selection process of the first channel extraction fusion sub-model is started to perform channel selection on the feature map set to obtain a first enhanced feature map subset.

Figure 4:
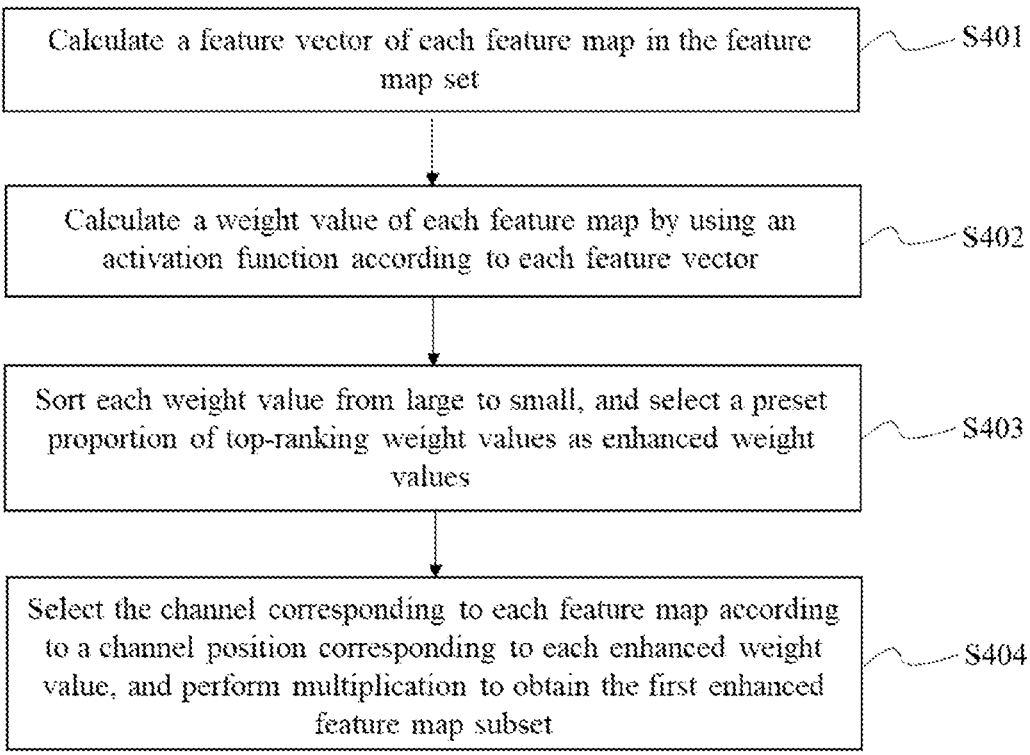
FIG. 4 is a flowchart of a practical representation mode of S301 in the image segmentation method in FIG. 3.

In some embodiments, as mentioned herein, the step that a first channel selection process of the first channel extraction fusion sub-model is started to perform channel selection on the feature map set to obtain a first enhanced feature map subset may specifically be implemented by steps shown in FIG. 4. FIG. 4 is a flowchart of a practical representation mode of S301 in the image segmentation method in FIG. 3. The following steps are specifically included.

At S401, a feature vector of each feature map in the feature map set is calculated.

At S402, a weight value of each feature map is calculated by using an activation function according to each feature vector.

At S403, each weight value is sorted from large to small, and a preset proportion of top-ranking weight values are selected as enhanced weight values.

At S404, the channel corresponding to each feature map is selected according to a channel position corresponding to each enhanced weight value, and multiplication is performed to obtain the first enhanced feature map subset.

Figure 5:
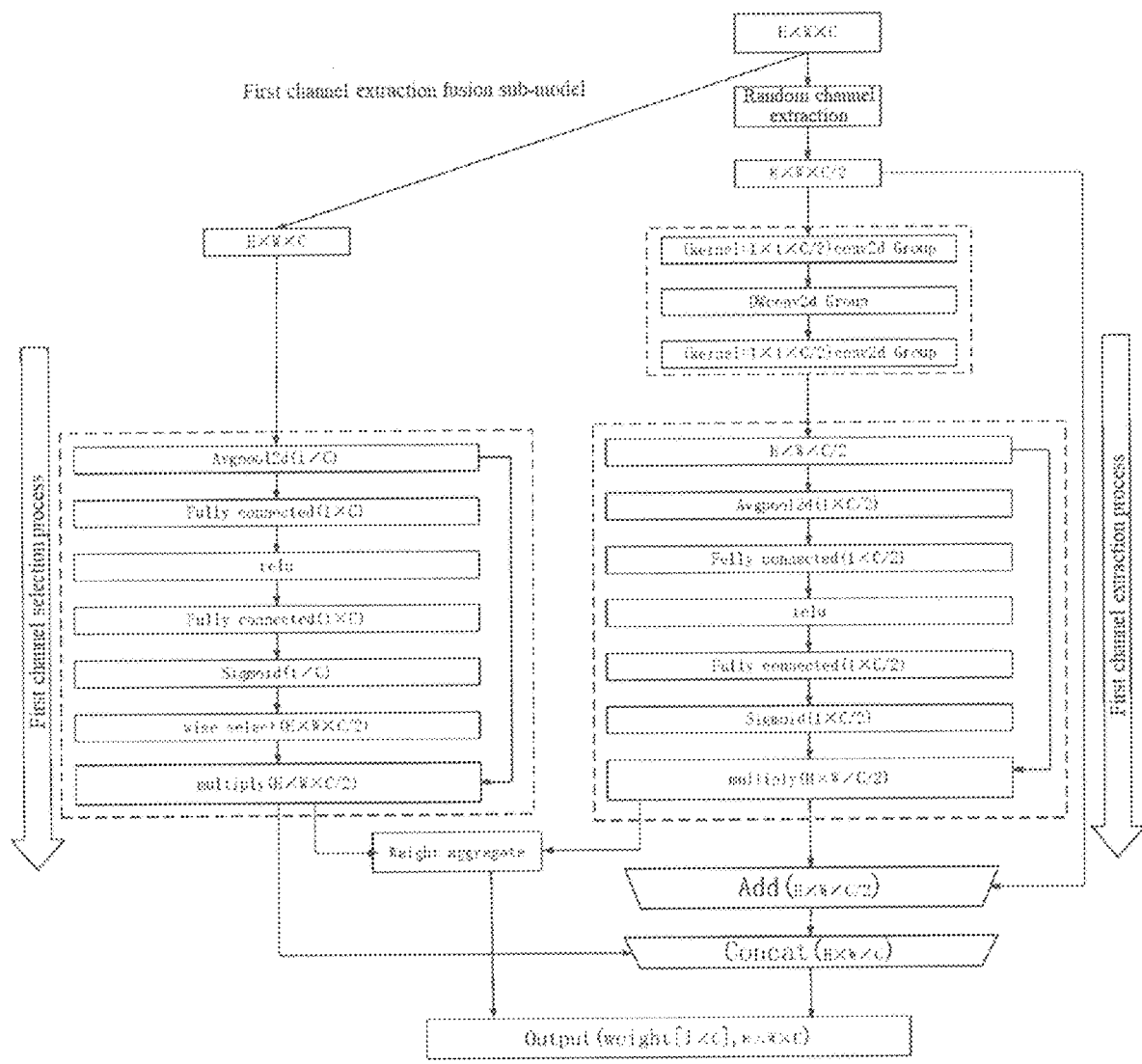
FIG. 5 is a schematic flowchart of a first channel extraction fusion sub-model according to an embodiment of the present application.

In a specific embodiment, a size of an input feature map of the first channel extraction fusion sub-model is H×W×C, where H represents the height, W represents the width, and C represents the number of channels. This input feature map may also be represented as batchsize×H×W×C, where batchsize represents the number of input feature maps. The same calculation method is used when the number of input feature maps is 1 and batchsize, so descriptions are made in the embodiment of the present application according to batchsize=1. Referring to FIG. 5, FIG. 5 is a schematic flowchart of a first channel extraction fusion sub-model according to an embodiment of the present application. As shown by a first channel selection process in FIG. 5, the first channel selection process of the first channel extraction fusion sub-model may be implemented by the following structure.

1) An input of the first channel extraction fusion sub-model is taken as an input, with a size of H×W×C.

2) The first channel selection process is then performed. A first layer of the first channel selection process is an Avgpool2d network. This network layer is a sampling layer. The H×W×C input feature map is traversed according to a dimension of channel C. An average value of the H×W feature map is calculated. A final output of the network is a 1×C vector.

3) A network of a second layer is a fully connected layer (fully connected). An output of this layer is a 1×C vector.

4) A network of a third layer is an activation function layer, i.e., Rectified Linear Unit (relu) network, and input features are nonlinearly mapped.

5) A network of a fourth layer is a fully connected layer (fully connected network). An output of this layer is a 1×C vector.

6) A fifth layer is an activation function layer. An activation function used in the present application is a sigmoid function. An output of this layer is 1×C.

7) A sixth layer is a wise select layer. This layer is for selecting C/2 best channels from the output of the previous layer by the following method: performing sorting according to the output result of the activation function layer, selecting and outputting C/2 weight values making an output value of the activation function maximum, and discarding the other small weight values. In this step, channels conducive to segmentation are screened out for calculation in the next step. To reduce the subsequent calculation amount, the number of input channels for calculation of a subsequent neural network layer is reduced.

8) A seventh layer is a multiply layer. This layer multiplies the weight value selected by the sixth layer and the corresponding input feature map. That is, the channel corresponding to the input feature map (H×W×C) is selected according to a channel position corresponding to the weight value, and multiplication is performed. In this step, a weight value is added for the channel conducive to segmentation, and then a higher weight is obtained for a channel more conducive to segmentation, whereby a larger expression is obtained. This weight value is obtained by training of the first to sixth layers. An output of this layer is a feature map of a size of H×W×C/2 and corresponding weight values (C/2).

At S302, a first feature extraction process of the first channel extraction fusion sub-model is started to perform feature extraction on the feature map set to obtain a second enhanced feature map subset.

Figure 6:
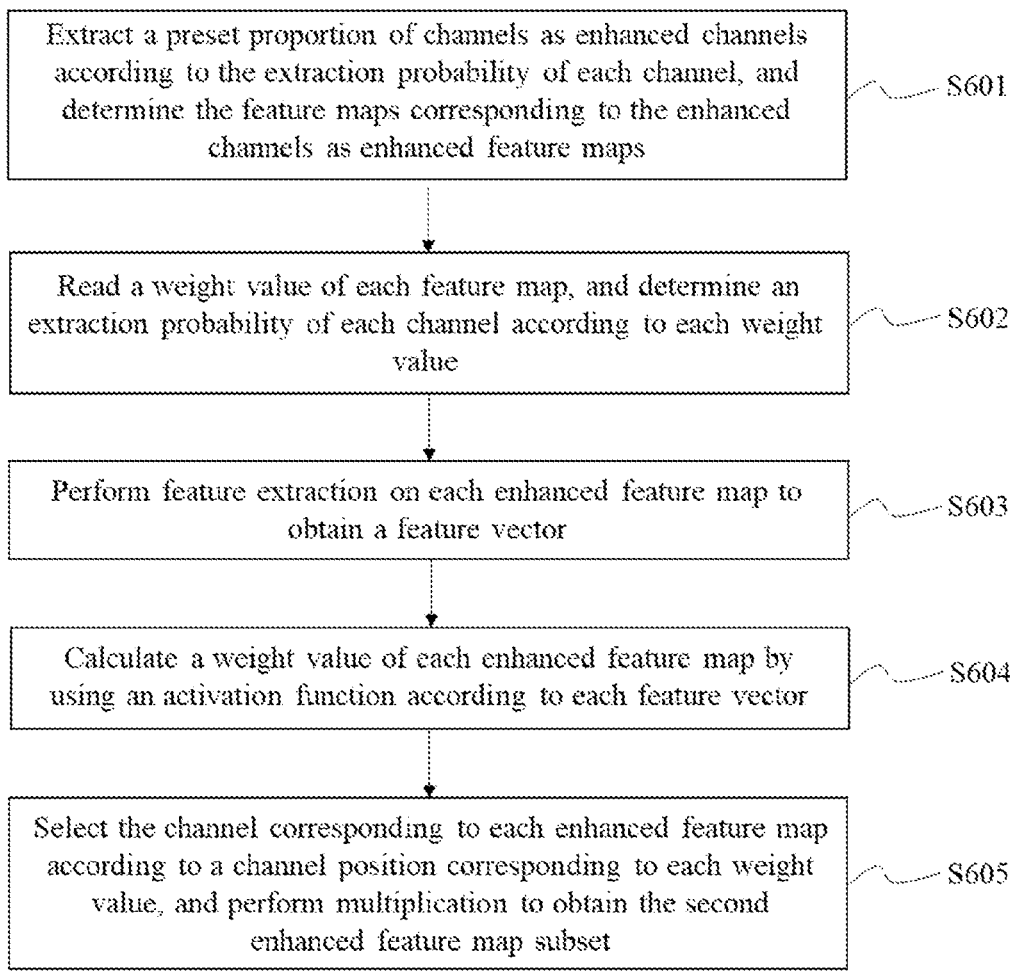
FIG. 6 is a flowchart of a practical representation mode of S302 in the image segmentation method in FIG. 3.

In some embodiments, as mentioned herein, the step that a first feature extraction process of the first channel extraction fusion sub-model is started to perform feature extraction on the feature map set to obtain a second enhanced feature map subset may specifically be implemented by steps shown in FIG. 6. FIG. 6 is a flowchart of a practical representation mode of S302 in the image segmentation method in FIG. 3. The following steps are specifically included.

At S601, a weight value of each feature map is read, and an extraction probability of each channel is determined according to each weight value.

At S602, a preset proportion of channels are extracted as enhanced channels according to the extraction probability of each channel, and the feature maps corresponding to the enhanced channels are determined as enhanced feature maps.

At S603, feature extraction is performed on each enhanced feature map to obtain a feature vector.

At S604, a weight value of each enhanced feature map is calculated by using an activation function according to each feature vector.

At S605, the channel corresponding to each enhanced feature map is selected according to a channel position corresponding to each weight value, and multiplication is performed to obtain the second enhanced feature map subset.

In a specific embodiment, as shown by a first feature extraction process in FIG. 5, the first feature extraction process of the first channel extraction fusion sub-model may be implemented by the following structure.

1) An input of the first channel extraction fusion sub-model is taken as an input, with a size of H×W×C.

2) The feature map passes through a "random channel extraction" module first. An implementation process of this module is as follows. A weight value weight[1×C] of the input feature map is read. The weight value is normalized. A distribution range of all elements of this parameter belongs to [0, 1], and a sum of all the elements is 1. Then, a normalized value is regarded as a probability, and channels are randomly extracted based on the probability. For example, after the feature map passes through the random channel extraction module, a size of an output feature map is H×W×C/2.

3) The feature map passes through a Two-Dimensional (2d) convolutional layer conv2d. In the present application, a 1×1 convolutional kernel is used, and the number of channels is C/2. An output of this layer is H×W×C/2.

4) The feature map passes through DWconv2d (depthwise separable cony). An output of this layer is H×W×C/2.

5) The feature map passes through a 2d convolutional layer. In the present application, a 1×1 convolutional kernel is used, and the number of channels is C/2. An output of this layer is H×W×C/2.

6) The input feature map H×W×C/2 is traversed by using an Avgpool2d network according to a dimension of channel "C". An average value of the H×W feature map is calculated. A final output is a 1×C/2 vector.

7) The next layer is a fully connected layer (fully connected network). An output of this layer is a 1×C/2 vector.

8) A network of the next layer is an activation function layer (relu network), and input features are nonlinearly mapped.

9) A network of the next layer is a fully connected layer (fully connected network). An output of this layer is a 1×C/2 vector.

10) A network of the next layer is an activation function layer. An activation function used in the present application is a sigmoid function. An output of this layer is 1×C/2.

11) The next layer is a multiply layer. This layer multiplies the output value of the previous layer and the corresponding input feature map (input feature map of the A model_2 layer). That is, the channel corresponding to the input feature map (H×W×C/2) is selected according to a channel position corresponding to a weight value, and multiplication is performed. In this step, a weight value is added for the channel of the input feature map, and then a higher weight is obtained for a channel more conducive to segmentation, whereby a larger expression is obtained. An output of this layer is a feature map of a size of H×W×C/2 and corresponding weight values (C/2).

12) The next layer is an add layer. This layer adds the input feature map of the fully connected layer and the output feature map of the multiply layer in one-to-one correspondence. An output feature map of this layer is H×W×C/2.

13) The next layer is a concatenation (concat) layer. This layer superimposes the result of the previous layer and a result of a wise channel select branch according to channels. A size of an output feature map of this layer is H×W×C.

14) Finally, a weight aggregate module is introduced. This module merges a weight output result of the multiply layer in the wise channel select branch and a weight output result of the multiply layer in a feature extract branch, and outputs a merged result to provide a support for subsequent network calculation.

At S303, the first enhanced feature map subset and the second enhanced feature map subset are superimposed according to channels to obtain the enhanced feature map set.

Figure 7:
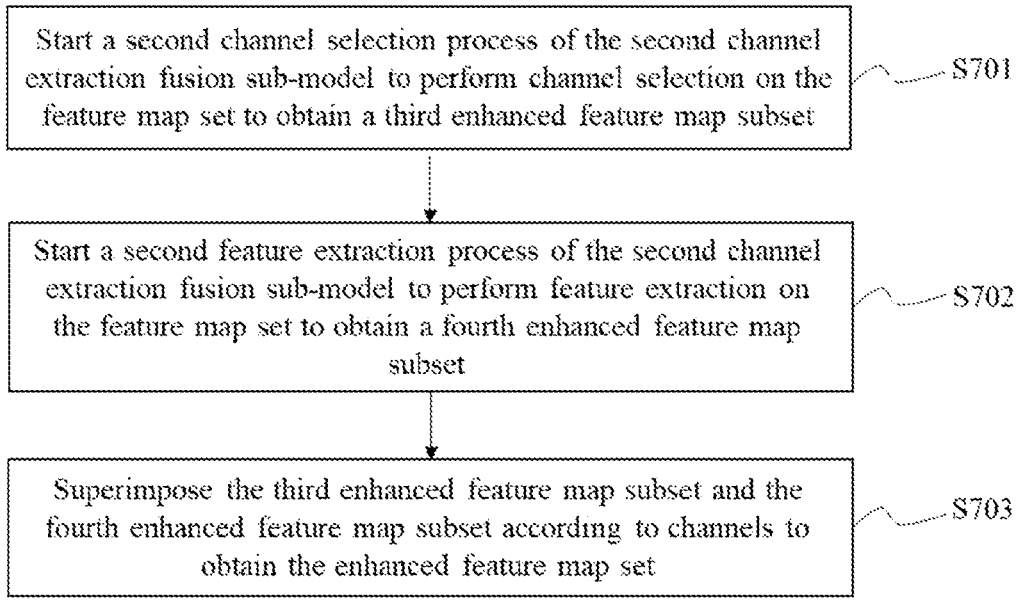
FIG. 7 is a flowchart of another practical representation mode of S103 in the image segmentation method in FIG. 1.

For step S103 in the previous embodiment, when the channel extraction fusion model includes a second channel extraction fusion sub-model, the described step that channel extraction fusion processing is performed on the feature map set by using a channel extraction fusion model to obtain an enhanced feature map set may specifically be implemented by steps shown in FIG. 7. The following makes descriptions in combination with FIG. 7.

Referring to FIG. 7, FIG. 7 is a flowchart of another practical representation mode of S103 in the image segmentation method in FIG. 1.

The following steps are specifically included.

At S701, a second channel selection process of the second channel extraction fusion sub-model is started to perform channel selection on the feature map set to obtain a third enhanced feature map subset.

Figure 8:
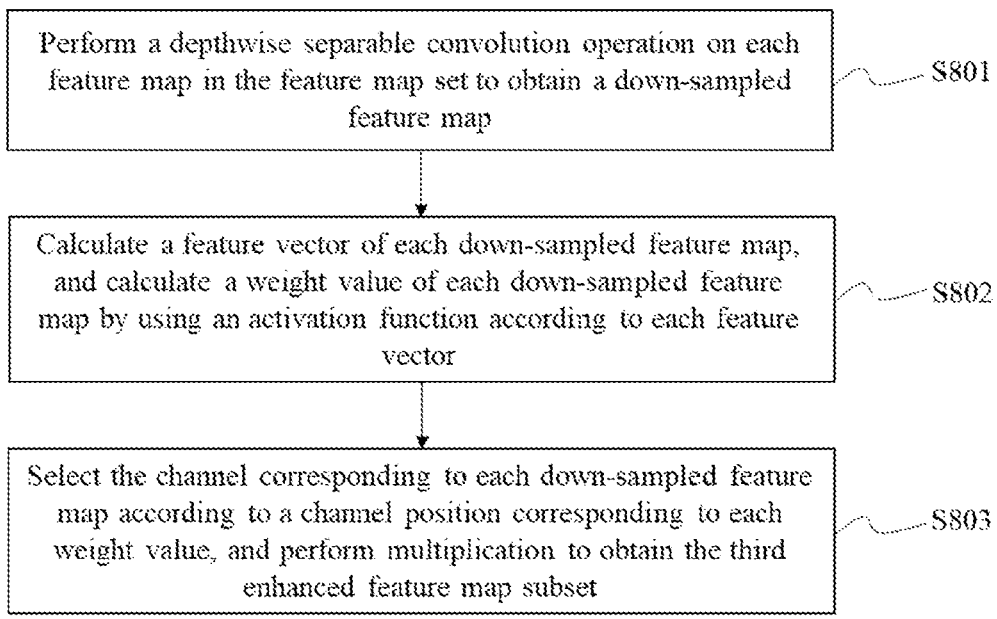
FIG. 8 is a flowchart of a practical representation mode of S701 in the image segmentation method in FIG. 7.

In some embodiments, as mentioned herein, the step that a second channel selection process of the second channel extraction fusion sub-model is started to perform channel selection on the feature map set to obtain a third enhanced feature map subset may specifically be implemented by steps shown in FIG. 8. FIG. 8 is a flowchart of a practical representation mode of S701 in the image segmentation method in FIG. 7. The following steps are specifically included.

At S801, a depthwise separable convolution operation is performed on each feature map in the feature map set to obtain a down-sampled feature map.

At S802, a feature vector of each down-sampled feature map is calculated, and a weight value of each down-sampled feature map is calculated by using an activation function according to each feature vector.

At S803, the channel corresponding to each down-sampled feature map is selected according to a channel position corresponding to each weight value, and multiplication is performed to obtain the third enhanced feature map subset.

Figure 9:
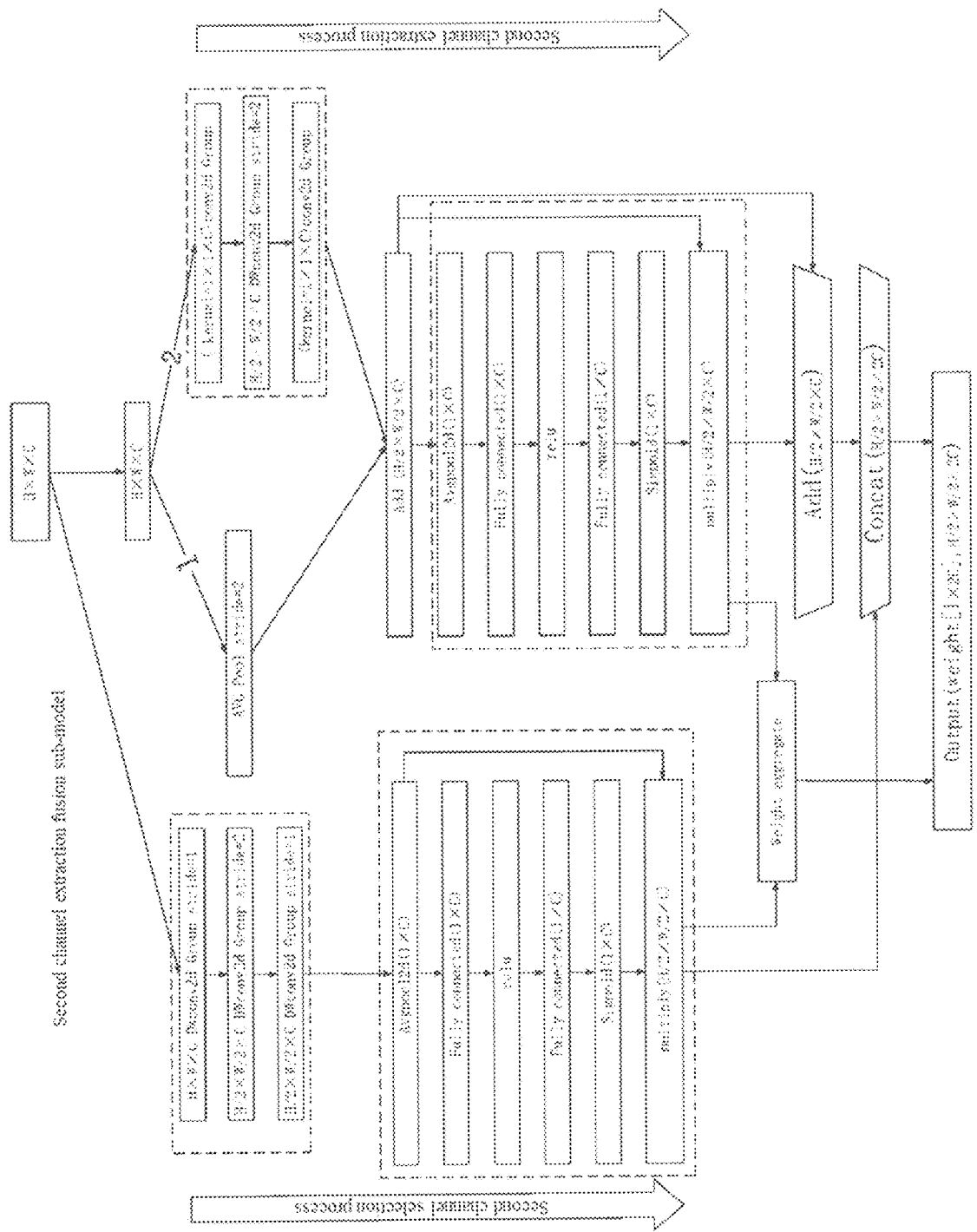
FIG. 9 is a schematic flowchart of a second channel extraction fusion sub-model according to an embodiment of the present application.

In a specific embodiment, referring to FIG. 9, FIG. 9 is a schematic flowchart of a second channel extraction fusion sub-model according to an embodiment of the present application. As shown by a second channel selection process in FIG. 9, the second channel selection process of the second channel extraction fusion sub-model may be implemented by the following structure.

1) An input of the second channel extraction fusion sub-model is taken as an input, with a size of H×W×C.

2) A depthwise separable cony layer (DWconv2d) is then entered, where the size of the feature map remains unchanged, and a size of an output feature map is H×W×C. Then, another DWconv2d layer is entered, where a stride is set to 2 such that a size of an output feature map is halved to H/2×W/2×C. Third, another DWconv2d layer is entered, where the stride is set to 1 such that a size of an output feature map remains unchanged, namely the size of the output feature map of this layer is H/2×W/2×C.

3) The second channel selection process is then performed. A first layer of the second channel selection process is an Avgpool2d network. This network layer is a sampling layer. The H/2×W/2×C input feature map is traversed according to a dimension of channel C. An average value of the H/2×W/2 feature map is calculated. A final output of the network is a 1×C vector.

4) A second layer is a fully connected layer. An output of this layer is a 1×C vector.

5) A network of the next layer is an activation function layer, and input features are nonlinearly mapped.

6) A network of a fourth layer is a fully connected layer. An output of this layer is a 1×C vector.

7) A fifth layer is an activation function layer. An activation function used in the embodiment of the present application is a sigmoid function. An output of this layer is 1×C.

8) A sixth layer is a multiply layer. This layer multiplies a weight value selected by the fifth layer and the input feature map of the corresponding channel. That is, the channel corresponding to the input feature map (H×W×C) is selected according to a channel position corresponding to the weight value, and multiplication is performed. In this step, a weight value is added for the channel conducive to segmentation, and then a higher weight is obtained for a channel more conducive to segmentation, whereby a larger expression is obtained. This weight value is obtained by training of the first to sixth layers. An output of this layer is a feature map of a size of H/2×W/2×C and corresponding weight values (C).

At S702, a second feature extraction process of the second channel extraction fusion sub-model is started to perform feature extraction on the feature map set to obtain a fourth enhanced feature map subset.

Figure 10:
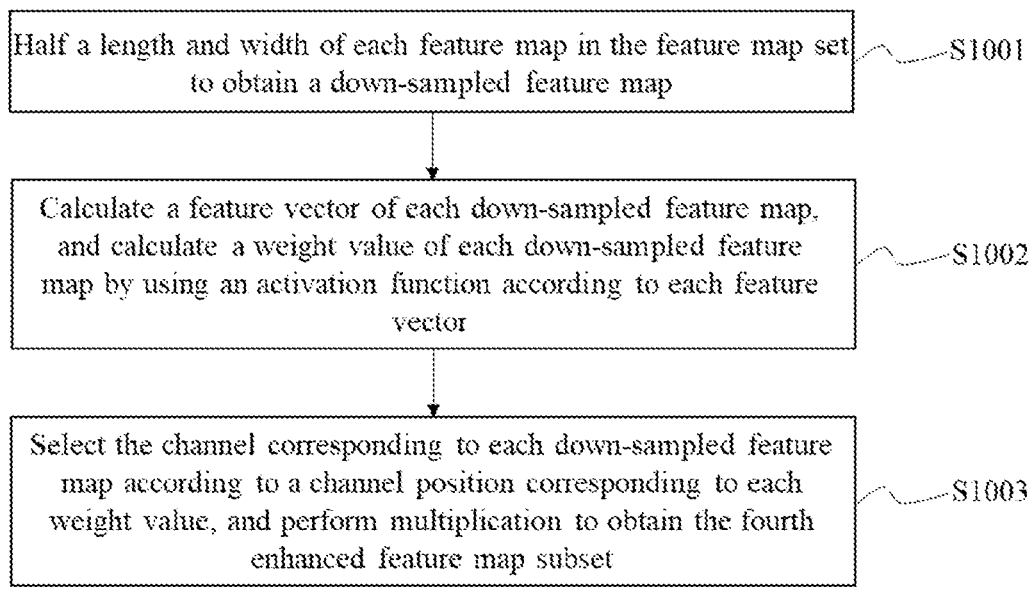
FIG. 10 is a flowchart of a practical representation mode of S702 in the image segmentation method in FIG. 7.

In some embodiments, as mentioned herein, the step that a second feature extraction process of the second channel extraction fusion sub-model is started to perform feature extraction on the feature map set to obtain a fourth enhanced feature map subset may specifically be implemented by steps shown in FIG. 10. FIG. 10 is a flowchart of a practical representation mode of S702 in the image segmentation method in FIG. 7. The following steps are specifically included.

At S1001, a length and width of each feature map in the feature map set are halved to obtain a down-sampled feature map.

At S1002, a feature vector of each down-sampled feature map is calculated, and a weight value of each down-sampled feature map is calculated by using an activation function according to each feature vector.

At S1003, the channel corresponding to each down-sampled feature map is selected according to a channel position corresponding to each weight value, and multiplication is performed to obtain the fourth enhanced feature map subset.

In a specific embodiment, as shown by a second feature extraction process in FIG. 9, the second feature extraction process of the second channel extraction fusion sub-model may be implemented by the following structure.

1) An input of the second channel extraction fusion sub-model is taken as an input, with a size of H×W×C.

2) This branch sends input data to two layers respectively channel 1 and channel 2.

The Avgpool2d layer halves H and W of the input feature map. A size of an output of this layer is H/2×W/2×C.

Channel 2 passes through a conv2d first. In the embodiment of the present application, a 1×1×C convolutional kernel is used. An output of this layer is H×W×C. Then, channel 2 passes through DWconv2d, and an output of this layer is H/2×W/2×C. Next, channel 2 passes through another conv2d, the number of channels being C, and an output of this layer is H/2×W/2×C.

3) The input data then passes through an add layer. This layer adds elements of output results of the two branches 1 and 2 in one-to-one correspondence. An output result of this layer is H/2×W/2×C.

4) The second feature extraction process is then performed. A first layer of the second feature extraction process is an Avgpool2d network. This network layer is a sampling layer. The H/2×W/2×C input feature map is traversed according to a dimension of channel C. An average value of the H/2×W/2 feature map is calculated. A final output of the network is a 1×C vector.

5) The next layer is a fully connected layer. An output of this layer is a 1×C vector.

6) A network of the next layer is an activation function layer, and input features are nonlinearly mapped.

7) A network of the next layer is a fully connected layer. An output of this layer is a 1×C vector.

8) The next layer is an activation function layer. An output of this layer is a 1×C.

9) The next layer is a multiply layer. This layer multiplies a weight value selected by the previous layer and the corresponding input feature map (input feature map of the second feature extraction process). That is, the channel corresponding to the input feature map (H/2×W/2×C) is selected according to a channel position corresponding to a weight value, and multiplication is performed. In this step, a weight value is added for the channel conducive to segmentation, and then a higher weight is obtained for a channel more conducive to segmentation, whereby a larger expression is obtained. An output of this layer is a feature map of a size of H/2×W/2×C and corresponding weight values (C).

10) The next layer is an add layer. This layer adds the input feature map of channel 2 and the output feature map of the multiply layer in one-to-one correspondence. An output feature map of this layer is H/2×W/2×C.

11) The next layer is a concat layer. This layer superimposes the result of the previous layer and a result of a wise channel select branch according to channels. A size of an output feature map of this layer is H/2×W/2×2C.

12) Finally, a weight aggregate module is introduced. This module merges a weight output result of the multiply layer in the wise channel select branch and a weight output result of the multiply layer in a feature extract branch, and outputs a merged result to provide a support for subsequent network calculation.

At S703, the third enhanced feature map subset and the fourth enhanced feature map subset are superimposed according to channels to obtain the enhanced feature map set.

Figure 11:
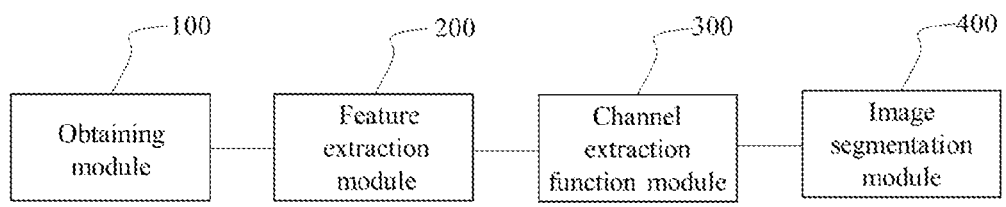
FIG. 11 is a structural diagram of an image segmentation system according to an embodiment of the present application.

Referring to FIG. 11, FIG. 11 is a structural diagram of an image segmentation system according to an embodiment of the present application.

The system may include:
an obtaining module 100, configured to obtain an original image set;
a feature extraction module 200, configured to perform feature extraction on the original image set by using a backbone network to obtain a feature map set;
a channel extraction fusion module 300, configured to perform channel extraction fusion processing on the feature map set by using a channel extraction fusion model to obtain an enhanced feature map set; and
an image segmentation module 400, configured to segment the enhanced feature map set by using a preset convolutional neural network to obtain an image segmentation result.

In some embodiments, the channel extraction fusion module 300 may include:
a first starting submodule, configured to start a first channel selection process of a first channel extraction fusion sub-model to perform channel selection on the feature map set to obtain a first enhanced feature map subset;
a second starting submodule, configured to start a first feature extraction process of the first channel extraction fusion sub-model to perform feature extraction on the feature map set to obtain a second enhanced feature map subset; and
a first superimposition submodule, configured to superimpose the first enhanced feature map subset and the second enhanced feature map subset according to channels to obtain the enhanced feature map set.

Further, the first starting submodule may include:
a first calculation unit, configured to calculate a feature vector of each feature map in the feature map set;
a second calculation unit, configured to calculate a weight value of each feature map by using an activation function according to each feature vector;

a first sorting unit, configured to sort each weight value from large to small, and select a preset proportion of top-ranking weight values as enhanced weight values; and a first selection unit, configured to select the channel corresponding to each feature map according to a channel position corresponding to each enhanced weight value, and perform multiplication to obtain the first enhanced feature map subset.

Further, the second starting submodule may include:

a reading unit, configured to read a weight value of each feature map, and determine an extraction probability of each channel according to each weight value;

an extraction unit, configured to extract a preset proportion of channels as enhanced channels according to the extraction probability of each channel, and determine the feature maps corresponding to the enhanced channels as enhanced feature maps;

a feature extraction unit, configured to perform feature extraction on each enhanced feature map to obtain feature vectors;

a third calculation unit, configured to calculate a weight value of each enhanced feature map by using an activation function according to each feature vector; and a second selection unit, configured to select the channel corresponding to each enhanced feature map according to a channel position corresponding to each weight value, and perform multiplication to obtain the second enhanced feature map subset.

In some embodiments, the channel extraction fusion module 300 may include:

a third starting submodule, configured to start a second channel selection process of a second channel extraction fusion sub-model to perform channel selection on the feature map set to obtain a third enhanced feature map subset;

a fourth starting submodule, configured to start a second feature extraction process of the second channel extraction fusion sub-model to perform feature extraction on the feature map set to obtain a fourth enhanced feature map subset; and a second superimposition submodule, configured to superimpose the third enhanced feature map subset and the fourth enhanced feature map subset according to channels to obtain the enhanced feature map set.

Further, the third starting submodule may include:

a first down-sampling unit, configured to perform a depthwise separable convolution operation on each feature map in the feature map set to obtain a down-sampled feature map;

a fourth calculation unit, configured to calculate a feature vector of each down-sampled feature map, and calculate a weight value of each down-sampled feature map by using an activation function according to each feature vector; and a third selection unit, configured to select the channel corresponding to each down-sampled feature map according to a channel position corresponding to each weight value, and perform multiplication to obtain the third enhanced feature map subset.

Further, the fourth starting submodule may include:

a second down-sampling unit, configured to halve a length and width of each feature map in the feature map set to obtain a down-sampled feature map;

a fifth calculation unit, configured to calculate a feature vector of each down-sampled feature map, and calculate a weight value of each down-sampled feature map by using an activation function according to each feature vector; and a fourth selection unit, configured to select the channel corresponding to each down-sampled feature map according to a channel position corresponding to each weight value, and perform multiplication to obtain the fourth enhanced feature map subset.

The embodiment of the system part is in mutual correspondence with the embodiment of the method part. Therefore, the embodiment of the system part refers to the descriptions about the embodiment of the method part, and will not be elaborated temporarily herein.

Figure 12:
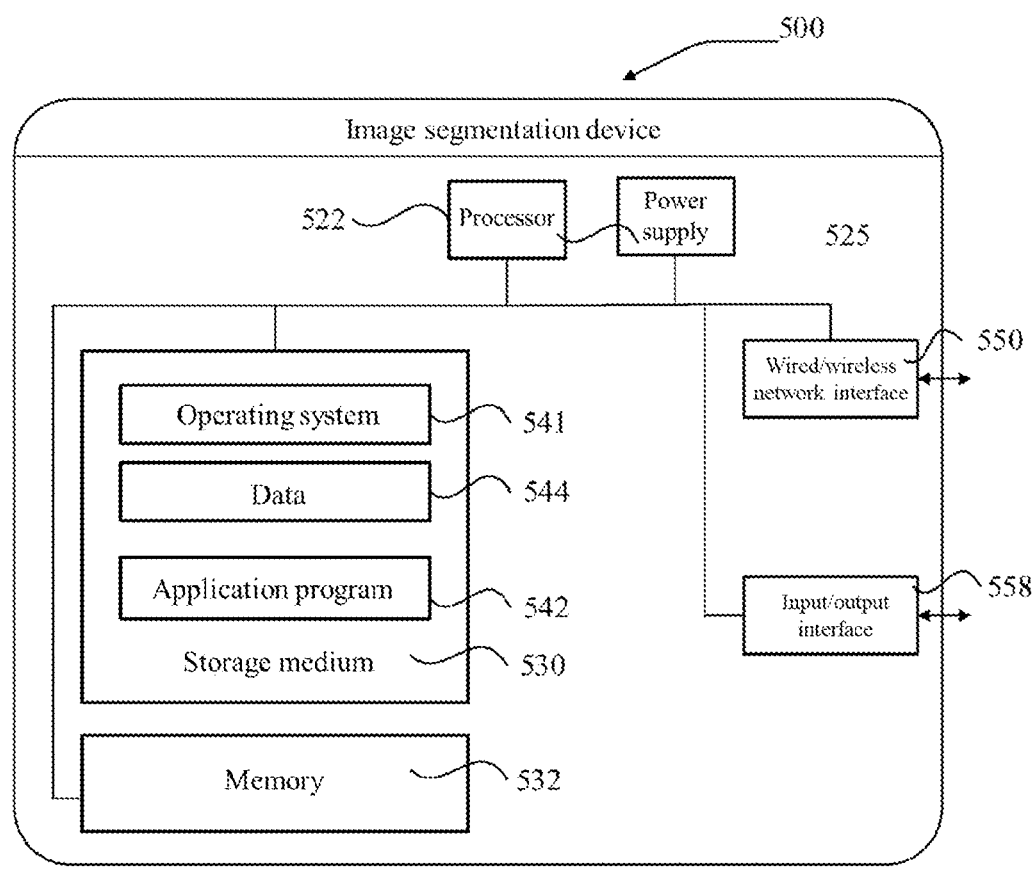
FIG. 12 is a structural diagram of an image segmentation device according to an embodiment of the present application.

Referring to FIG. 12, FIG. 12 is a structural diagram of an image segmentation device according to an embodiment of the present application.

The image segmentation device 500 may differ greatly in case of different configurations or performance. It may include one or more Central Processing Units (CPUs) 522 (such as one or more processors), a memory 532, and one or more storage media 530 (such as one or more mass storage devices) storing APPs 542 or data 544. The memory 532 and the storage medium 530 may implement temporary storage or persistent storage. The program stored in the storage medium 530 may include one or more modules (not shown in the figure), each of which may include a series of instruction operations on an apparatus. Furthermore, the CPU 522 may be configured to communicate with the storage medium 530 to execute, on the image segmentation device 500, the series of instruction operations in the storage medium 530.

The image segmentation device 500 may further include one or more power supplies 525, one or more wired or wireless network interfaces 550, one or more input/output interfaces 558, and/or, one or more operating systems 541, such as Windows Server™, Mac OS X™, Unix™, Linux™, and FreeBSD™.

The steps in the image segmentation method described in FIGS. 1 to 10 are implemented by the image segmentation device based on the structure shown in FIG. 12.

Those skilled in the art may clearly learn about that, for ease and brevity of description, specific working processes of the system, apparatus, and module described above may refer to the corresponding processes in the method embodiment, and will not be elaborated herein.

In some embodiments provided in the present application, it is to be understood that the disclosed apparatus, device, and method may be implemented in manners. For example, the apparatus embodiment described above is only schematic. For example, division of the modules is only logic function division, and other division manners may be used in practical implementation. For example, multiple modules or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the modules, and may be electrical, mechanical, etc.

The modules described as separate parts may or may not be physically separated. Parts displayed as modules may or may not be physical modules, namely they may be located in the same place, or distributed to multiple network modules. Part or all of the modules may be selected as practically required to achieve the objective of the solution of the present embodiment.

In addition, each function module in each embodiment of the present application may be integrated into a processing module. Alternatively, each module may physically exist independently. Alternatively, two or more than two modules may be integrated into a module. The integrated module may be implemented in a hardware form, or in form of a software function module.

When being implemented in form of a software function module and sold or used as an independent product, the integrated module may be stored in a computer-readable storage medium. Based on such an understanding, the technical solutions of the present application substantially or parts making contributions to the prior art or all or part of the technical solutions may be embodied in form of a software product. The computer software product is stored in a storage medium, including a plurality of instructions for enabling a computer device (which may be a personal computer, a function calling apparatus, a network device, or the like) to execute all or part of the steps of the method in each embodiment of the present application. The storage medium includes various media capable of storing program codes, such as a U disk, a mobile hard disk, a Read-Only Memory (ROM), a Random Access Memory (RAM), a magnetic disk, or an optical disk.

The image segmentation method, system, and device and computer-readable storage medium provided in the present application are introduced above in detail. The principle and implementation modes of the present application are described herein with specific examples, and the descriptions about the above embodiments are only for helping in understanding the method and core idea of the present application. It is to be pointed out that those ordinarily skilled in the art may further make a plurality of improvements and embellishments to the present application without departing from the principle of the present application, and these improvements and embellishments shall also fall within the scope of protection of the claims of the present application.

It is also to be noted that relational terms in the specification, such as first and second, are used only to distinguish an entity or operation from another entity or operation and do not necessarily require or imply the existence of any practical relation or sequence between these entities or operations. Moreover, terms "include" and "contain" or any other variation thereof is intended to cover nonexclusive inclusions, whereby a process, method, object, or device including a series of elements not only includes those elements but also includes other elements that are not clearly listed, or further includes elements intrinsic to the process, the method, the object, or the device. With no more restrictions, an element defined by statement "including a/an . . . " does not exclude the existence of the same other elements in a process, method, object, or device including the element.

What is claimed is:

1. An image segmentation method, comprising:
obtaining an original image set;
performing feature extraction on the original image set by using a backbone network to obtain a feature map set;
performing channel extraction fusion processing on the feature map set by using a channel extraction fusion model to obtain an enhanced feature map set; and
segmenting the enhanced feature map set by using a preset convolutional neural network to obtain an image segmentation result,
wherein when the channel extraction fusion model comprises a first channel extraction fusion sub-model, the performing channel extraction fusion processing on the feature map set by using the channel extraction fusion model to obtain the enhanced feature map set comprises:
starting a first channel selection process of the first channel extraction fusion sub-model to perform channel selection on the feature map set to obtain a first enhanced feature map subset;
starting a first feature extraction process of the first channel extraction fusion sub-model to perform feature extraction on the feature map set to obtain a second enhanced feature map subset; and
superimposing the first enhanced feature map subset and the second enhanced feature map subset to obtain the enhanced feature map set,
wherein the starting the first channel selection process of the first channel extraction fusion sub-model to perform channel selection on the feature map set to obtain the first enhanced feature map subset comprises:
calculating a feature vector of each feature map in the feature map set;
calculating a weight value of each feature map by using an activation function according to each feature vector;
sorting each weight value from large to small, and selecting a preset proportion of top-ranking weight values as enhanced weight values; and
selecting a channel corresponding to each feature map according to a channel position corresponding to each enhanced weight value, and performing multiplication to obtain the first enhanced feature map subset,
wherein the starting the first feature extraction process of the first channel extraction fusion sub-model to perform feature extraction on the feature map set to obtain the second enhanced feature map subset comprises:
reading the weight value of each feature map, and determining an extraction probability of each channel according to each weight value;
extracting a preset proportion of channels as enhanced channels according to the extraction probability of each channel, and determining feature maps corresponding to the enhanced channels as enhanced feature maps;
performing feature extraction on each enhanced feature map to obtain a feature vector;
calculating a weight value of each enhanced feature map by using an activation function according to each feature vector; and
selecting a channel corresponding to each enhanced feature map according to a channel position corresponding to each weight value of each enhanced feature map, and performing multiplication to obtain the second enhanced feature map subset.

2. The method according to claim 1, wherein when the channel extraction fusion model comprises a second channel extraction fusion sub-model, the performing channel extraction fusion processing on the feature map set by using the channel extraction fusion model to obtain the enhanced feature map set comprises:
starting a second channel selection process of the second channel extraction fusion sub-model to perform channel selection on the feature map set to obtain a third enhanced feature map subset;
starting a second feature extraction process of the second channel extraction fusion sub-model to perform feature extraction on the feature map set to obtain a fourth enhanced feature map subset; and superimposing the third enhanced feature map subset and the fourth enhanced feature map subset to obtain the enhanced feature map set.

3. The method according to claim 2, wherein the starting the second channel selection process of the second channel extraction fusion sub-model to perform channel selection on the feature map set to obtain the third enhanced feature map subset comprises:

performing a depthwise separable convolution operation on each feature map in the feature map set to obtain a down-sampled feature map;

calculating a feature vector of each down-sampled feature map, and calculating a weight value of each down-sampled feature map by using an activation function according to each feature vector; and selecting a channel corresponding to each down-sampled feature map according to a channel position corresponding to each weight value of each down-sampled feature map, and performing multiplication to obtain the third enhanced feature map subset.

4. The method according to claim 2, wherein the starting the second feature extraction process of the second channel extraction fusion sub-model to perform feature extraction on the feature map set to obtain the fourth enhanced feature map subset comprises:

halving a length and width of each feature map in the feature map set to obtain a down-sampled feature map;

calculating a feature vector of each down-sampled feature map, and calculating a weight value of each down-sampled feature map by using an activation function according to each feature vector; and selecting a channel corresponding to each down-sampled feature map according to a channel position corresponding to each weight value of each down-sampled feature map, and performing multiplication to obtain the fourth enhanced feature map subset.

5. An image segmentation device, comprising:

a memory, configured to store a computer program; and a processor, configured to execute the computer program to cause the processor to perform operations comprising:

obtaining an original image set;

performing feature extraction on the original image set by using a backbone network to obtain a feature map set;

performing channel extraction fusion processing on the feature map set by using a channel extraction fusion model to obtain an enhanced feature map set; and segmenting the enhanced feature map set by using a preset convolutional neural network to obtain an image segmentation result, wherein when the operation of channel extraction fusion model comprises a first channel extraction fusion sub-model, the performing channel extraction fusion processing on the feature map set by using the channel extraction fusion model to obtain the enhanced feature map set comprises:

starting a first channel selection process of the first channel extraction fusion sub-model to perform channel selection on the feature map set to obtain a first enhanced feature map subset;

starting a first feature extraction process of the first channel extraction fusion sub-model to perform feature extraction on the feature map set to obtain a second enhanced feature map subset; and superimposing the first enhanced feature map subset and the second enhanced feature map subset to obtain the enhanced feature map set, wherein the operation of starting the first channel selection process of the first channel extraction fusion sub-model to perform channel selection on the feature map set to obtain the first enhanced feature map subset comprises:

calculating a feature vector of each feature map in the feature map set;

calculating a weight value of each feature map by using an activation function according to each feature vector;

sorting each weight value from large to small, and selecting a preset proportion of top-ranking weight values as enhanced weight values; and selecting a channel corresponding to each feature map according to a channel position corresponding to each enhanced weight value, and performing multiplication to obtain the first enhanced feature map subset, wherein the operation of starting the first feature extraction process of the first channel extraction fusion sub-model to perform feature extraction on the feature map set to obtain the second enhanced feature map subset comprises:

reading the weight value of each feature map, and determining an extraction probability of each channel according to each weight value;

extracting a preset proportion of channels as enhanced channels according to the extraction probability of each channel, and determining feature maps corresponding to the enhanced channels as enhanced feature maps;

performing feature extraction on each enhanced feature map to obtain a feature vector;

calculating a weight value of each enhanced feature map by using an activation function according to each feature vector; and selecting a channel corresponding to each enhanced feature map according to a channel position corresponding to each weight value of each enhanced feature map, and performing multiplication to obtain the second enhanced feature map subset.

6. The image segmentation device according to claim 5, wherein when the channel extraction fusion model comprises a second channel extraction fusion sub-model, the operation of performing channel extraction fusion processing on the feature map set by using the channel extraction fusion model to obtain the enhanced feature map set comprises:

starting a second channel selection process of the second channel extraction fusion sub-model to perform channel selection on the feature map set to obtain a third enhanced feature map subset;

starting a second feature extraction process of the second channel extraction fusion sub-model to perform feature extraction on the feature map set to obtain a fourth enhanced feature map subset; and superimposing the third enhanced feature map subset and the fourth enhanced feature map subset to obtain the enhanced feature map set.

7. The image segmentation device according to claim 6, wherein the operation of starting the second channel selection process of the second channel extraction fusion sub-model to perform channel selection on the feature map set to obtain the third enhanced feature map subset comprises:

performing a depthwise separable convolution operation on each feature map in the feature map set to obtain a down-sampled feature map;

calculating a feature vector of each down-sampled feature map, and calculating a weight value of each down-sampled feature map by using an activation function according to each feature vector; and selecting a channel corresponding to each down-sampled feature map according to a channel position corresponding to each weight value of each down-sampled feature map, and performing multiplication to obtain the third enhanced feature map subset.

8. The image segmentation device according to claim 6, wherein the operation of starting the second feature extraction process of the second channel extraction fusion sub-model to perform feature extraction on the feature map set to obtain the fourth enhanced feature map subset comprises:

halving a length and width of each feature map in the feature map set to obtain a down-sampled feature map;

calculating a feature vector of each down-sampled feature map, and calculating a weight value of each down-sampled feature map by using an activation function according to each feature vector; and selecting a channel corresponding to each down-sampled feature map according to a channel position corresponding to each weight value of each down-sampled feature map, and performing multiplication to obtain the fourth enhanced feature map subset.

9. A non-transitory readable storage medium, characterized by storing a computer program that is executed by a processor, and upon execution by the processor, is configured to cause the processor to perform operations comprising:

obtaining an original image set;

performing feature extraction on the original image set by using a backbone network to obtain a feature map set;

performing channel extraction fusion processing on the feature map set by using a channel extraction fusion model to obtain an enhanced feature map set; and segmenting the enhanced feature map set by using a preset convolutional neural network to obtain an image segmentation result, wherein when the channel extraction fusion model comprises a first channel extraction fusion sub-model, the operation of performing channel extraction fusion processing on the feature map set by using the channel extraction fusion model to obtain the enhanced feature map set comprises:

starting a first channel selection process of the first channel extraction fusion sub-model to perform channel selection on the feature map set to obtain a first enhanced feature map subset;

starting a first feature extraction process of the first channel extraction fusion sub-model to perform feature extraction on the feature map set to obtain a second enhanced feature map subset; and superimposing the first enhanced feature map subset and the second enhanced feature map subset to obtain the enhanced feature map set, wherein the operation of starting the first channel selection process of the first channel extraction fusion sub-model to perform channel selection on the feature map set to obtain the first enhanced feature map subset comprises:

calculating a feature vector of each feature map in the feature map set;

calculating a weight value of each feature map by using an activation function according to each feature vector;

sorting each weight value from large to small, and selecting a preset proportion of top-ranking weight values as enhanced weight values; and selecting a channel corresponding to each feature map according to a channel position corresponding to each enhanced weight value, and performing multiplication to obtain the first enhanced feature map subset, wherein the operation of starting the first feature extraction process of the first channel extraction fusion sub-model to perform feature extraction on the feature map set to obtain the second enhanced feature map subset comprises:

reading the weight value of each feature map, and determining an extraction probability of each channel according to each weight value;

extracting a preset proportion of channels as enhanced channels according to the extraction probability of each channel, and determining feature maps corresponding to the enhanced channels as enhanced feature maps;

performing feature extraction on each enhanced feature map to obtain a feature vector;

calculating a weight value of each enhanced feature map by using an activation function according to each feature vector; and selecting a channel corresponding to each enhanced feature map according to a channel position corresponding to each weight value of each enhanced feature map, and performing multiplication to obtain the second enhanced feature map subset.

10. The non-transitory readable storage medium according to claim 9, wherein when the channel extraction fusion model comprises a second channel extraction fusion sub-model, the operation of performing channel extraction fusion processing on the feature map set by using the channel extraction fusion model to obtain the enhanced feature map set comprises:

starting a second channel selection process of the second channel extraction fusion sub-model to perform channel selection on the feature map set to obtain a third enhanced feature map subset;

starting a second feature extraction process of the second channel extraction fusion sub-model to perform feature extraction on the feature map set to obtain a fourth enhanced feature map subset; and superimposing the third enhanced feature map subset and the fourth enhanced feature map subset to obtain the enhanced feature map set.

11. The non-transitory readable storage medium according to claim 10, wherein the operation of starting the second channel selection process of the second channel extraction fusion sub-model to perform channel selection on the feature map set to obtain the third enhanced feature map subset comprises:

performing a depthwise separable convolution operation on each feature map in the feature map set to obtain a down-sampled feature map;

calculating a feature vector of each down-sampled feature map, and calculating a weight value of each down-sampled feature map by using an activation function according to each feature vector; and selecting a channel corresponding to each down-sampled feature map according to a channel position corresponding to each weight value of each down-sampled feature map, and performing multiplication to obtain the third enhanced feature map subset.

\* \* \* \* \*